(No Model.)

J. P. JOHNSON.
CLOD CRUSHER AND HARROW.

No. 338,974. Patented Mar. 30, 1886.

Witnesses
Percy C. Bowen
John H. Siggers

Inventor
James P. Johnson

By his Attorneys
C. A. Snow & Co.

UNITED STATES PATENT OFFICE.

JAMES P. JOHNSON, OF RACCOON VALLEY, TENNESSEE.

CLOD-CRUSHER AND HARROW.

SPECIFICATION forming part of Letters Patent No. 338,974, dated March 30, 1886.

Application filed December 19, 1885. Serial No. 186,215. (No model.)

*To all whom it may concern:*

Be it known that I, JAMES P. JOHNSON, a citizen of the United States, residing at Raccoon Valley, in the county of Union and State of Tennessee, have invented a new and useful Improvement in Clod-Crushers and Harrows, of which the following is a specification, reference being had to the accompanying drawings.

My invention relates to an improvement in clod-crushers and harrows; and it consists in the peculiar construction and combination of devices that will be more fully set forth hereinafter, and particularly pointed out in the claim.

Figure 1:
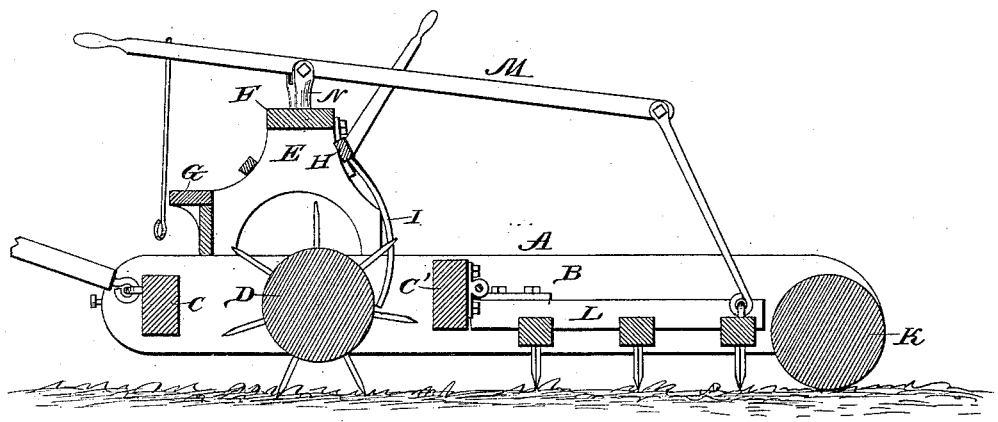
Figure 2:
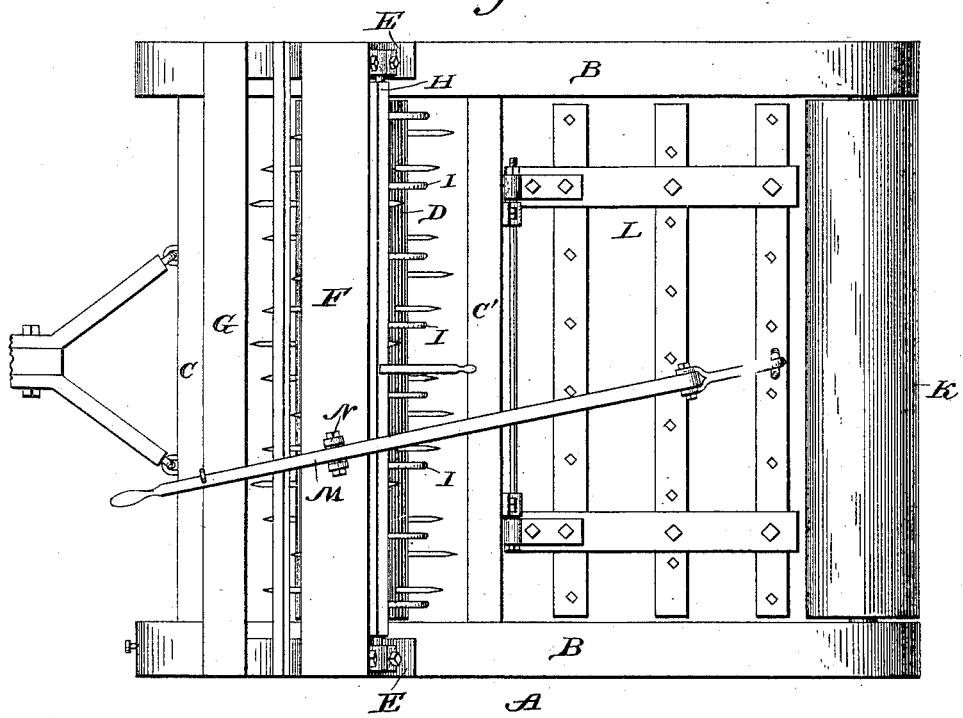

In the drawings, Figure 1 is a vertical longitudinal sectional view of a clod-crusher and harrow emboding my invention. Fig. 2 is a top plan view of the same.

A represents a frame composed of the side beams, B, the front tie-beam, C, and the tie-beam C'. In the front end of this frame is journaled a spiked or toothed roller, D, which may be made of a single piece or composed of two or more sections. Brackets E are secured on the upper sides of the beams B at the front ends thereof, and the said brackets are connected at their upper sides by a seat-board, F, above the toothed roller. A foot-board, G, extends across the frame in front of and at a suitable distance below the seat-board.

H represents a bar that is journaled in the rear sides of the brackets and extends across the frame. This bar is provided with curved teeth I, that extend down to the roller D and bear on the rear upper side thereof. The function of these teeth is to scrape the roller and clear it of adhering trash or earth. In the rear end of the frame A is journaled a plain roller, K, that follows the toothed roller when the machine is drawn along. A rectangular harrow, L, has its front end hinged to the bar C' and extends nearly to the roller K, the sides of the said harrow extending nearly to the beams B.

M represents a hand-lever, which is fulcrumed in a bracket, N, on the seat-board, and is connected to the harrow L, so that the said harrow may be raised by the driver, when necessary, in order to clear its teeth of trash. A tongue, which is of the usual construction, is attached to the front end of the frame A to serve as a means for the attachment of a draft-team. It will be seen that as the machine is drawn along the clods are thoroughly broken up and crushed by the roller D, and the ground harrowed by the harrow-teeth, and finally rolled by the roller K, thus putting the ground in thorough condition for planting.

Having thus described my invention, I claim—

In a clod-crusher and harrow, the combination of the frame A, carrying the spiked roller D and the plain roller K, the rock-bar H, having the teeth I bearing on the roller D, the harrow L, hinged to the frame between the rollers, and the lever M, for raising the harrow, substantially as described.

In testimony that I claim the foregoing as my own I have hereto affixed my signature in presence of two witnesses.

JAMES P. JOHNSON.

Witnesses:
 JAMES S. LEDGEWOOD,
 WILLIAM C. SHARP.